United States Patent [19]
Bull et al.

[11] 3,982,122
[45] Sept. 21, 1976

[54] LAMP ASSEMBLY

[75] Inventors: Dale L. Bull; Norman A. Rautiola, both of Reed City, Mich.

[73] Assignee: Nartron Corporation, Reed City, Mich.

[22] Filed: Jan. 28, 1975

[21] Appl. No.: 544,773

[52] U.S. Cl. .............................. 240/152; 240/8.16
[51] Int. Cl.² ...................... F21V 17/00; F21Q 3/00
[58] Field of Search .... 240/152, 151, 153, 10.6 SD, 240/8.16, 8.18, 7.45, 37, 41 L, 46.33, 46.45, 102 R, 2.1; 339/129, 130, 126 R, 128; 340/52 R, 32, 79, 85; 248/27; 350/252, 257, 57, 58, 59

[56] References Cited
UNITED STATES PATENTS

| | | |
|---|---|---|
| 3,220,001 | 11/1965 | Hollerberg .................... 240/151 X |
| 3,235,834 | 2/1966 | O'Keefe et al. .............. 339/130 C X |
| 3,387,255 | 6/1968 | Earlywine, Jr. ................. 240/152 X |
| 3,424,414 | 1/1969 | Horwitt ............................... 248/27 |
| 3,489,891 | 1/1970 | Altissimo ....................... 240/152 X |
| 3,678,261 | 7/1972 | McNeil ............................. 248/27 X |
| 3,777,137 | 12/1973 | Costanzo et al. ............... 240/152 X |

Primary Examiner—Joseph F. Peters, Jr.
Attorney, Agent, or Firm—Lon H. Romanski

[57] ABSTRACT

A lamp assembly, such as an indicator type, has a main body detachably secureable to an associated support, as, for example, an instrument panel of a related vehicle, with such body enabling the easy connection thereto of an associated bulb socket structure as well as a related lens; such body further enabling the removal and replacement of the bulb from either end of the body.

14 Claims, 9 Drawing Figures

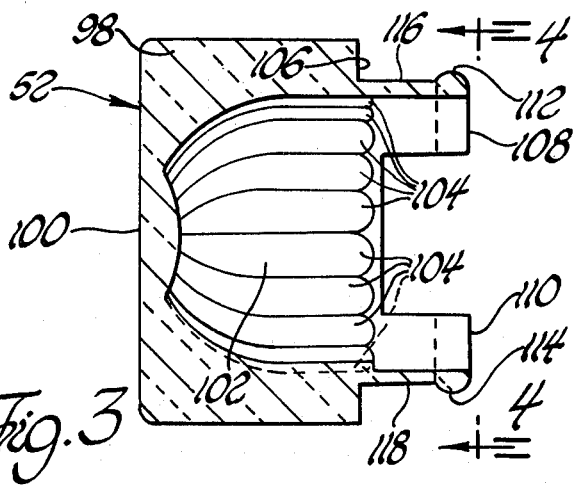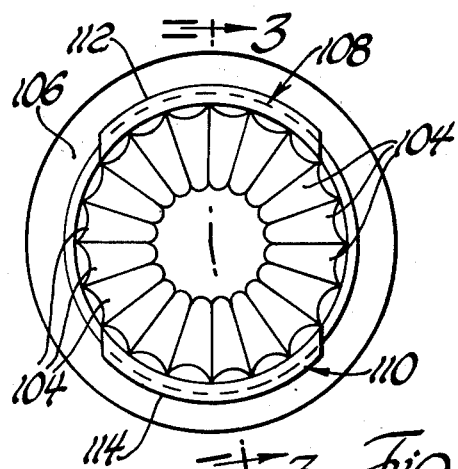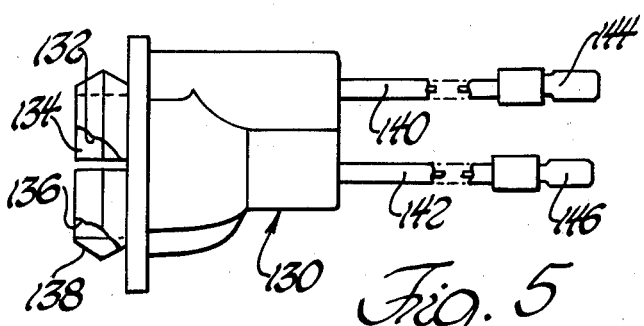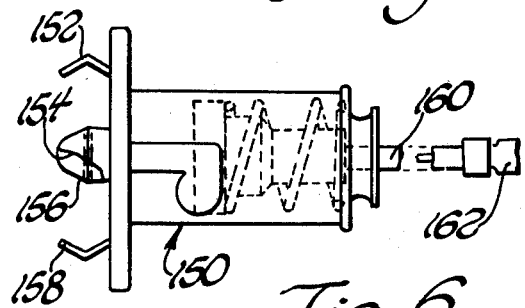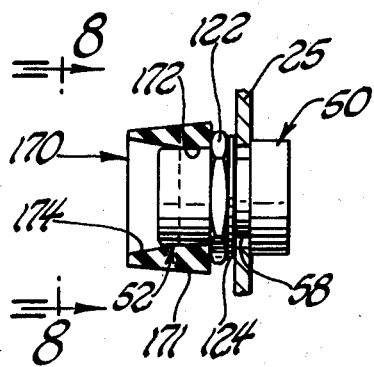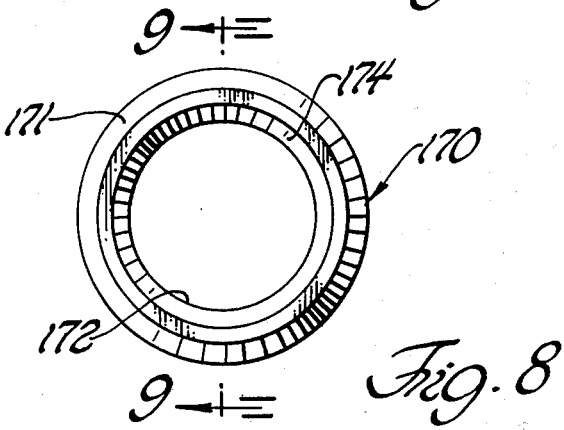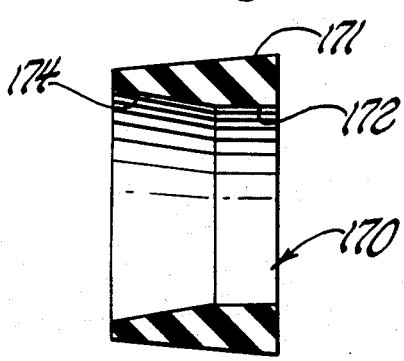

LAMP ASSEMBLY

BACKGROUND OF THE INVENTION

Generally, in the automotive field, especially with regard to trucks, indicator lamp assemblies are employed as to indicate, by their respective energization, that certain selected functions or vehicular operating parometers are in an unacceptable condition. For example, as in a truck, such indicator lamp assemblies may be operatively connected to related sender units which are, in turn, responsive to indicia of engine oil level, engine temperature, loss of engine coolant, generator or alternator output level, actuation or operation of anti-skid mechanism, air pressure in truck air tanks, headlamp selection (whether high or low beam), or parking brake engagement.

Since trucks represent a comparatively high financial investment and since the only way that a profitable return of such investment can be assured is to keep such trucks in use for as long as possible with as little "down-time" (the time during which the truck is taken out of productive use such as, for example, maintenance or inspection) as possible, great care is taken to prevent operation of a truck when all important conditions of such truck are not judged to be to standard as well as to achieve engine shut-down as quickly as possible after the occurrence of a related failure. Such may occur merely as, for example, prevention of damage to the engine or as a safety measure as, for example, a progressive loss of air pressure in a truck employing pneumatically actuated brakes.

The truck industry has, heretofore, employed one or more indicator lamp assemblies to thereby create, upon energization thereof, a visual signal to the operator that a particular parameter is experiencing less than satisfactory conditions thereby enabling the operator or driver to take corrective action.

Usually a plurality of such indicator lamp assemblies are employed and mounted as on the instrument panel. Further, provision is often made so that upon the operator turning the ignition key toward the engine cranking or "start" position, all of the electrical circuits leading to the indicator lamp assemblies are closed thereby causing energization of the lamp assemblies. It is at this time that the operator can see whether all of the lamp assemblies are still functioning or if any bulb replacement is required.

However, various problems have arisen because of the prior art indicator lamp assemblies. For example, certain of the prior art indicator lamp assemblies employ bulbs of a shank length different from the shank length of bulbs employed in other prior art indicator lamp assemblies. This means that in order to provide for all contingencies, the various truck service centers, as well as the truck operator, must carry a supply of all sizes of bulbs since it is possible that bulbs of differing shank sizes will have to be replaced. Obviously, times occur when the particular size of bulb is not available and because of the reluctance of the operator to operate the truck without being assured that the particular related sensed condition is acceptable, additional "down-time" is created in order to properly inspect the related structure.

Further, since non-energization of an indicator lamp assembly can occur for reasons other than bulb failure, additional problems have been experienced with the prior art indicator lamp assemblies. That is, such non-energization can be the result of a failure within the bulb socket assembly or the electrical conductors leading from the socket assembly to the related source of electrical potential. Because the prior art employed various designs of socket assemblies and because a particular truck instrument panel was effective to receive only one particular design of socket assembly it has heretofore been necessary that truck service centers (often referred to as "truck stops") maintain a large inventory in order to be able to provide whatever design of socket assembly may be required by any particular truck having that need.

The prior art indicator lamp assemblies have created additional problems also resulting in increased costs. For example, generally it is well known that for various reasons it is desireable to make the cab portion (that part of the truck providing space for the operator and associated controls and instruments) as short in length as possible while still providing adequate space for the operator. Consequently, the space as between the instrument panel and, for example, the forward wall of the cab portion is kept at an absolute minimum with such space being filled with as much related operating equipment, controls, linkages and electrical conductors as is practicably possible.

Because of this compactness of construction of the cab it becomes difficult not only to service, for example, the replacement of bulbs which have failed in the indicator lamp assemblies but also in the actual construction of the cab by the truck builder. That is, almost exclusively the prior art indicator lamp assemblies are such as to require the removal and replacement of the bulb from the rear or underside of the instrument panel and, as already stated, such space is usually very limited.

Generally, the builders of trucks in their manufacturing proceedures, more specifically, during assembly of the instrument panel and the subsequent assembling of the completed instrument panel to the cab, require that the indicator lamp assemblies be first assembled to the instrument panel, as to comprise a portion of the completed instrument panel before such completed instrument panel is assembled to the cab. This enables the instrument panel to be completed as at a station which is not part of the final assembly of the vehicle.

According to the prior art, the lamp assemblies were thereby assembled. However, because such prior art lamp assemblies were, in the main, constructed of a body-like bulb socket with male type blade terminals carried directly thereby, the assembly of the completed instrument panel onto the cab required the use of intermediate wire harness assemblies which would at one end plug into or onto the blade terminals of the lamp assemblies and, at the other end, plug into terminal ends of vehicular wiring system which could take the form of a second wiring harness. This meant that not only was the final assembly doubly difficult because of the requirement that each lamp assembly had to have two electrical connections made in order to complete a wiring system thereto, but also the fact that two such terminal sets were used for each lamp assembly doubled the possibility of failure at such terminal points. Also, because of the very small space behind or below the instrument panel, it is difficult to assure that proper connections are made to the prior art socket assembly because the terminals thereof are situated relatively closely to the rear or under surface of the instrument panel.

Other problems also exist with respect to the prior art. For example, prior art indicator lamp assemblies often have a lens which is screwed onto the body of the lamp assembly. As is apparent, because of the thread lead, it becomes impossible to both tighten the lens onto the body and at the same time be assured that the lens will assume a particular desired position so that any words (such as, for example, "HOT", "OIL", "AIR") formed on such lens are easily readable by the operator. With such prior art lamp assemblies, the lens would have to be tightened and then the lamp body-like socket assembly would have to be turned or rotated until the lens was in a proper attitude at which point the securing means would be tightened. Such time-consuming operations did not totally correct the problem because even after the lens and body-like socket assembly are initially properly secured, the vibrations caused during truck use and consequently experienced by the prior art lamp assembly usually results in the lens becoming loosened as well as the body-like socket assembly rotating within its cooperating mounting aperture in the instrument panel. As is apparent, such vibrations cause misalignment of the prior art lenses.

Accordingly, the invention as herein disclosed and described is primarily directed to the solution of the above as well as other related problems.

SUMMARY OF THE INVENTION

According to the invention, an indicator lamp assembly comprises a lamp assembly body, means formed on said body for enabling said body to be detachably secured to associated support structure, said body having a first open end for detachably receiving therein a portion of a lens, said body having a second open end for detachably receiving therein a portion of an associated bulb socket assembly, and passage means formed in said body between and interconnecting said first and second open ends, said passage means being adapted to receive therein a portion of a bulb operatively connected to and carried by said socket assembly.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 3 is a cross-sectional view of the lens shown in both FIGS. 2 and 4 taken generally on the plane of line 3—3 of FIG. 4 and looking in the direction of the arrows;

FIG. 4 is an end elevational view of the lens of FIG. 3 taken generally on the plane of line 4—4 of FIG. 3 and looking in the direction of the arrows;

FIG. 5 is a side elevational view of another typical socket assembly employable in practicing the invention;

FIG. 6 is a side elevational view of still another typical socket assembly employable in practicing the invention;

FIG. 7 is a cross-sectional view of a shroud, employable in combination with the indicator lamp a-sembly of the invention;

FIG. 8 is an enlarged and elevational view taken generally on the plane of line 8—8 of FIG. 7 and looking in the direction of the arrows; and FIG. 9 is an axial cross-sectional view taken generally on the plane of line 9—9 of FIG. 8 and looking in the direction of the arrows.

DETAILED DESCRIPTION OF THE PREFERRED EMBODIMENTS

Figure 1:
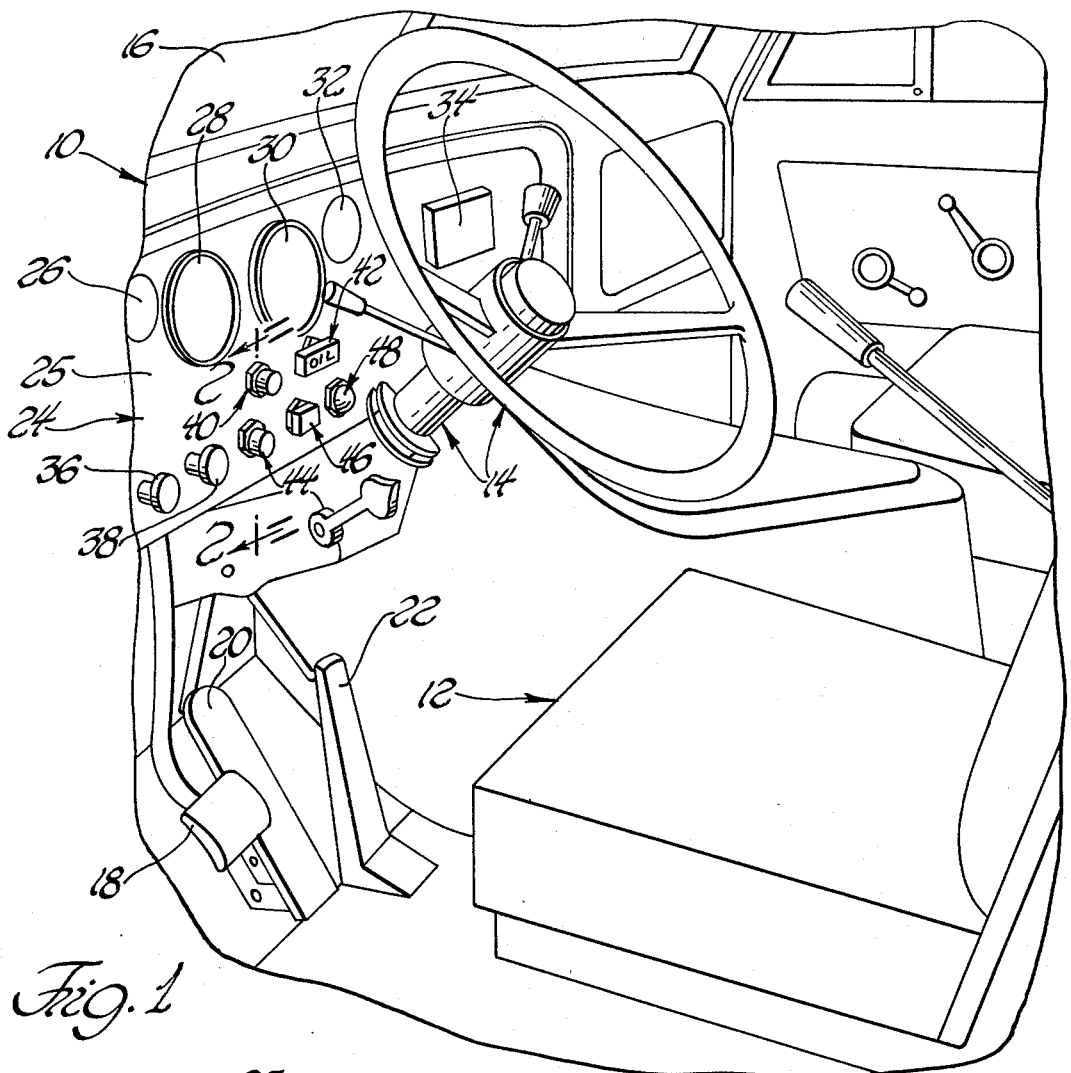
FIG. 1 is a fragmentary perspective view of an interior of a truck cab having an instrument panel employing indicator lamp assemblies constructed in accordance with the teachings of the invention.

Referring now in greater detail to the drawings, FIG. 1 illustrates the interior of a truck cab 10 as being comprised of, for example, a driver's or operator's seat assembly 12, steering wheel and column assembly 14, windshield 16, operator's foot actuated levers and pedals 18, 20 and 22, and instrument panel 25 assembly 24 comprising a panel-like support and an array of gauges 26, 28, 30, 32 and 34, controls 36, 38 and a plurality of indicator lamp assemblies 40, 42, 44, 46 and 48.

Figure 2:
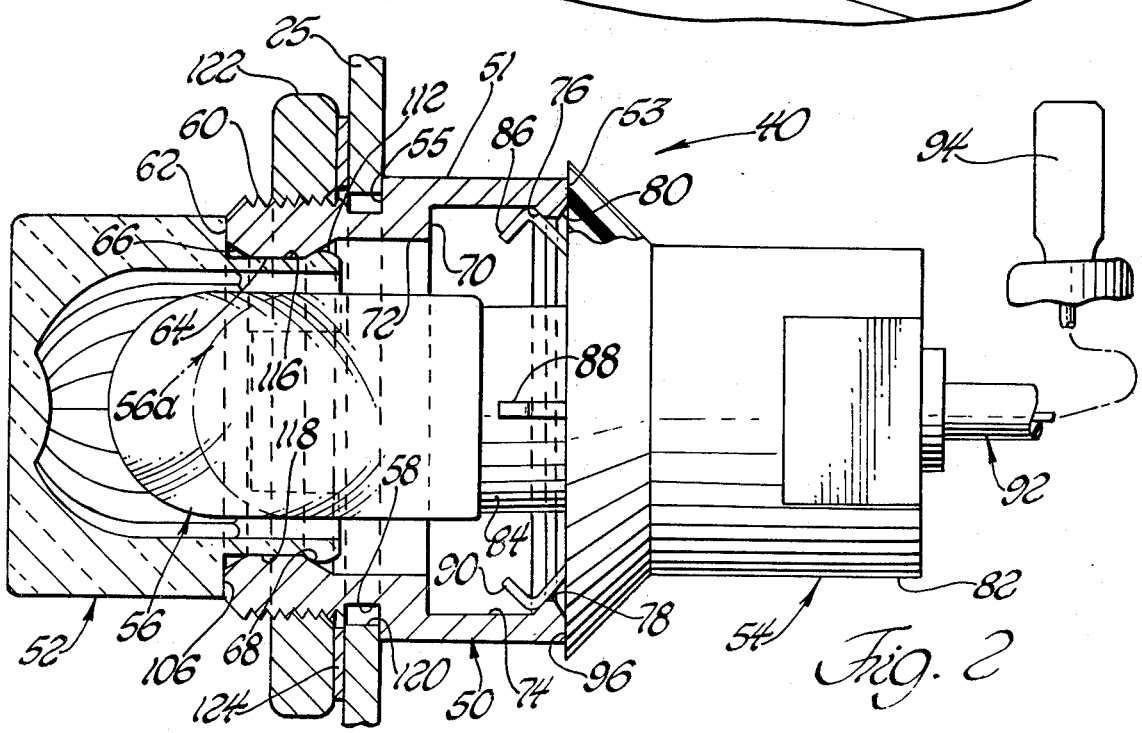
FIG. 2 is an enlarged view, partly in cross-section, taken generally on the plane of line 2—2 of FIG. 1 and looking in the direction of the arrows.

In FIG. 2, the indicator lamp assembly 40 is illustrated as being comprised of a main body or housing 50, lens 52, bulb socket assembly 54 and cooperating bulb 56, all being secured to and carried as by panel or support 25 of the instrument panel assembly 24.

In the preferred embodiment of the invention, body or housing 50 is preferably generally tubular having a relatively large outer cylindrical surface 51 terminating at the right end in a transverse, preferably normal end abutment surface 53 and terminating at the left end in a flange-like or shoulder surface 55 formed as by a diametrically necked-down portion 58. The left end of the body 50 has an externally threaded portion 60 which generally extends from the necked-down portion 58 and terminates at its left in a transverse, preferably normal, second and abutment surface 62.

A first generally cylindrical clearance passageway 64, formed within body 50, terminates at its forward or left end in a first annular inclined or ramp surface 66 and, similarly, terminates at its rearward or right end in a second annular inclined or ramp surface 68. As is evident from the drawings, both ramp means 66 and 68 are so formed as to increase in effective diameter as such ramp means extend away from clearance passageway 64.

The second or inner ramp means 68, as it generally radiates away from passageway 64, terminates and/or blends into a second generally cylindrical clearance passageway 72 which, as illustrated terminates in a radially outwardly directed shoulder or wall portion 70 formed as by a third further enlarged clearance passageway 74.

As shown, clearance passageway 74, at its right or rearward end, terminates in a third generally radially inwardly directed annular inclined or ramp surface 76 which, at its radially innermost end terminates in a fourth clearance passageway 78. Similar to ramp surface 66, a generally annular inclined or ramp surface 80 extends from clearance passageway 78 generally radially outwardly until it terminates in transverse end abutment surface 53.

The body or housing 82 of socket assembly 54 may be formed of electrically non-conductive plastic material with a suitable centrally located cylindrical recess formed therein, as is well known in the art, adapted to receive therein the male plug-in portion 84 of bulb assembly 56. Also, as is well known in the art, the male plug-in portion 84 may be of the bayonet lock type wherein a tab carried at the side of portion 84 becomes locked against an electrically conductive member within the bulb-receiving recess while a spring loaded contact at the end of the recess engages the end of the portion 84 to thereby complete a circuit through and with the bulb 56. As is also well known in the art, the electrically conductive member within the bulb-receiving recess may be physically and electrically connected to a plurality of generally annularly positioned detent-like resilient latching arms, three of which are shown at 86, 88 and 90, each effectively secured to socket housing body 82. The detent or latching arms, in the embodiment of FIG. 2, are electrically conductive so that the grounding circuit can be affected as through body 50 and panel 25. As generally illustrated an elongated wire harness 92 (in the embodiment of FIG. 2 such harness comprising a single electrical conductor) is operatively electrically connected at its inner end to the spring loaded contact within body 82 while the other end of harness 92 is provided with a suitable terminal contact 94 engageable with related wiring of, for example, the truck cab 10.

As should be apparent, when socket assembly 54 is in a disconnected state from body 50 all that needs to be done to affect operative connection therebetween is to push the socket assembly 54 against the rear or right open end of housing or body 50. In so doing, the forward inclined portions of latching arms 86, 88 and 90 operatively engage ramp surface 80 and, upon continued applied force, latching arms 86, 88 and 90 will resiliently deflect radially inwardly as to thereby pass through clearance passageway 78. Once such arms 86, 88 and 90 pass through clearance passageway the said latching arms, under their own inherent resilient force, move radially outwardly thereby causing the rearward inclined portions of such latching arms to respectively engage the ramp or annular locking surface 76. The dimensions and configurations of the respective cooperating elements is such as to preferably cause forward end surface 96 of body 82 to be in abutting engagement with housing end surface 53 prior to latching arms 86, 88 and 90 dissipating all of the inherent resiliant force thereby assuring a sound latched engagement as between housing body 50 and socket assembly 54.

The lens 52, more clearly illustrated in FIG. 3 and 4, is preferably formed of high-impact resistant polycarbonate and, as will become evident, preferably formed as to be a reflex lens thereby causing radiation of light emitted by bulb 56 instead of merely a glow.

In the embodiment of FIGS. 2, 3 and 4, the main body 98 of lens 52 is generally cylindrical as to outer configuration having a forward closed end wall 100 and a rearward open end defined as by a cavity or chamber 102 formed within such lens body. The wall of chamber 102 is formed as by a plurality of reflex type contoured surfaces 104 which serve to cause refraction of the light and thereby affect light radiation through the lens. The right end of lens body 98 terminates in an annular shoulder or flange-like surface 106 which, as shown in FIG. 2, when assembled to housing 50 is in abutting engagement with end abutment surface 62 of such housing 50.

The lens means 52 is also provided with a plurality of integrally formed generally axially extending latching legs or portions 108 and 110 which, because of their material and configuration are able to exhibit a degree of flexibility and attendant resilient resistance. As viewed in FIG. 4, such latching or detent legs 108 and 110 are arcuate segments and as best seen in FIG. 3 the extreme free ends of such legs 108 and 110 are provided with enlarged bead-like portions 112 and 114 extending generally radially outwardly thereof.

When lens means 52 is in a detached state, all that needs to be done to assemble it to body 50, is to push the lens against the left or forward open end of housing 50 thereby causing detent arms 108 and 110 to simultaneously engage ramp means 66 and resiliently deflect generally radially inwardly until such latching arms 108 and 110 along with bead portions 112 and 114 pass through clearance passageway 64. Upon further movement of lens 52 toward housing 50, latching legs 108 and 110 will, because of inherent resilient force, move radially outwardly causing the bead portions 112 and 114 to engage and press radially outwardly against the inner latching or ramp surface 68. In the preferred embodiment, the dimensions and configurations of the respective cooperating elements are such as to preferably cause lens abutment surface 106 to be in abutting engagement with housing forward end surface 62 prior to latching means 108 and 110 dissipating all of the inherent resilient force; further, in the preferred embodiment, it is desirable to have surfaces 62 and 106 abutting and bead portions 112 and 114 firmly engaged with ramp means 68 without having the radially outer surfaces 116 and 118 of legs 108 and 110 in any way engaging the surface of clearance passageway 64. This serves to maximize the holding power of the bead portions 112 and 114 with a resulting continual attendant axial force component urging surface 106 into engagement with surface 62.

As generally depicted in FIG. 1, the outer lens configuration may be of any desired shape. For example, the lenses of indicator lamp assemblies 40 and 44 are generally cylindrical, the lens of indicator lamp assembly 42 is illustrated as being generally rectangular or parallelpiped, the lens of indicator lamp assembly 46 is illustrated as being generally square or cubic, while the lens of indicator lamp assembly 48 is depicted as being of generally spherical conformation. Further, as generally depicted by the word "OIL" on the lens of indicator lamp assembly 42, the lens may have, as by, for example, hot stamping, any desired legend formed thereon. Of course, all of the lenses, regardless of outer configurations would be provided with suitable detent or latching legs equivalent to legs 108 and 110.

As shown in FIG. 2, the entire assembly may be secured to the associated support structure or panel 25 as by having threaded portion 60 pass through mounting aperture 120 formed in panel 25 and then securing housing wall 55 against panel 25 as by the threadably engaged nut 122 and associated washer 124. If the lens then is one which carries a legend thereon, and such legend is not properly aligned for easy reading, all that needs to be done to correct that is to grasp the lens 52 and rotate it against the frictional resistance, of coacting surfaces 62 and 106 as well as 112, 114 and 68 until the desired attitude is attained.

In view of the foregoing, it should be apparent that the invention provides an assembly whereby either long length bulbs 56 or relatively short length bulbs as at 56a can be equally accommodated thereby obviating the necessity of keeping in effect a double inventory of bulbs. Further, with the invention no problems are encountered in trying to align, to a desired attitude, the position of a legend carried by the lens.

The invention also enables, for example, the bulb 56 to be changed from either the front or the rear of the support or instrument panel 24. If removal of the bulb is to be affected from the front, all that needs to be done is to exert a slight oblique force against the lens and directed generally away from the body 50 thereby causing the lens 52 to become disengaged and exposing the bulb 56 for removal. If removal of the bulb is to be affected from the rear, all that needs to be done is to similarly exert a slight oblique force against the socket body 82 and directed generally away from the body 50 thereby causing the socket assembly to become disengaged from body 50 while still retaining bulb 56 in such socket assembly. The bulb can then be replaced in the socket assembly and such again latched to the body 50 as previously described.

FIGS. 5 and 6 illustrate, not by way of limitation but rather by way of further example, other socket assemblies employable in the invention. The structure of FIG. 5 is of plastic or other suitable electrically non-conductive material. The main differance from the socket assembly 34 of FIG. 2 is that socket assembly 130 has integrally formed electrically non-conductive annularly situated detent or latching members 132, 134, 136 and 138 (which function in the manner of latch means 86, 88 and 90) and a plurality of extending electrical conductors 140 and 142, with respective terminal members 144 and 146, comprising the wiring harness as to achieve, for example, a remote ground connection.

FIG. 6 illustrates a metal type socket assembly 150 having integrally formed latching or detent means 152, 154, 156 and 158 (functioning in the manner of means 86, 88 and 90) with a single electrical conductor 160 extending therefrom and terminating in, for example, male terminal 162. The ground connection, of course, can be affected through the latch means 152, 154, 156 and 158 as well as the contact between the plug-in portion of the associated bulb and the main body of assembly 150.

In another aspect, the invention contemplates the provision of a shroud to fit about the lens so as to: further beautify the light or lamp assembly; prevent spurious light from falsely indicating apparent energization of the shrouded lens; to even cover the fastening nut 122 to still further enhance the aesthetic qualities of the lamp asembly; and, where needed, to provide for safety considerations relative to protruding objects.

In FIG. 7 a generally tubular shroud 170 is shown situated about lens 52 and secured thereto as by an effective press or interference fit as between the diameter of inner annular surface 172 of shroud 170 and the outer diameter of lens 52. As best seen in FIGS. 8 and 9, the outer surface 171 of the wall of the shroud 170 is preferably tapered as to be generally frusto-conical while the continuation or extension 174 of the cylindrical surface 172 is similarly conical but oppositely directed as to have its widest portion near the forward or top end of the shroud to thereby enhance the cone of visibility for the operator.

where safety considerations are dictated, it is preferred that the shroud be formed of, for example, a vinyl material in the order of a 75 durometer reading, while where no such safety considerations are necessary, the material may have a durometer reading in the order of, for example, 95–100.

Further, such shrouds may be molded from any suitable material as from either a rigid transparent plastic (possibly colored as red) to thereby increase the apparent size of the indicator lamp lens and increase the visual effect of the lamp assembly for the operator, or as from a totally opaque material as for complete shading of the lens as from sun light. Also, if such be desired, it is of course possible that the inner portion of the right end of the shroud may be internally threaded as to thereby coact with the threaded portion 60 of the housing or body 50.

Even though it should be well apparent, in view of the disclosure, nevertheless it should possibly be mentioned that the invention provides further benefits over the prior art. For example, the housing 50 also serves as an adapter. That is it really, in addition to comprising a lamp assembly, serves to adapt the coacting components and sub-assemblies to the particular associated mounting or support means. In this regard, it should also be pointed out that the provision of the threaded portion 60 enables the entire assembly to be axially positioned with respect to the mounting panel 25. That is, for example, it is possible to provide a second nut, functionally equivalent to nut 122, generally behind the panel 25 and thereby, in cooperation with nut 122, both axially position and secure the lamp assembly 40 with respect to panel 25. Further, as should be evident, it is also possible to provide suitable shims or lock washers as between shoulder 55 and the rear side of panel 25 to also axially adjust the relative position of the entire assembly 40 with regard to panel 25. This axial adjustment enables the lens 52 to attain a desired extent of projection from the panel 25. Also, in some mounting panels functionally equivalent to panel 25, a threaded aperture may be provided instead of aperture 120. Such threaded aperture would then threadably cooperate with threaded portion 60 to thereby secure the housing or adpater 50 to the mounting panel. Of course, in such cases, a rearwardly situated nut and/or shims or lock washers, as previously described, may also be employed. Such a threadable engagement between the lamp assembly and coacting mounting panel is not attainable with the prior art structures.

Although only one preferred embodiment, along with certain modifications of the invention, have been disclosed and described, it is apparent that other embodiments and modifications of the invention are possible within the scope of the appended claims.

We claim:

1. A lamp assembly, comprising body means, said body means being adapted to be supported by associated support means, a first open end formed in said body means, a second open end formed in said body means, clearance passage means formed through said body means and operatively interconnecting said first and second open ends, lens means operatively connected to said body means as to be supported and carried thereby effectively closing said first open end, first detent-like latching means effective for detachably securing said lens means to said body means, and said second open end being adapted to have operatively connected thereto bulb socket means whereby bulb means carried by said socket means extends into said clearance passage means and upon energization emit light against said lens means, said first detent-like latching means being effective to enable said lens means to be removed from or attached to said body means without the necessity of having to cause relative motion as between said body means and said associated support means, and said bulb socket means also being disconnectable from said body means without the necessity of having to disconnect said lens means from said body means.

2. A lamp assembly according to claim 1 wherein said first latching means comprises first substantially non-deflectable ramp-like retaining surface means formed generally in said clearance passage means, and first resiliently deflectable means carried by said lens means effective for engaging said first retaining surface means to thereby detachably retain said lens means onto said body means, and further comprising second detent-like latching means effective for detachably securing said socket means to said body means, said second latching means comprising second substantially non-deflectable ramp-like retaining surface means formed generally in said clearance passage means, said first retaining surface means being formed within said clearance passage means and spaced axially inwardly of said body means with respect to said first open end, said second retaining surface means being formed within said clearance passage means axially spaced from said first retaining surface means and spaced axially inwardly of said body means with respect to said second open end, said second retaining surface means being effective to receive engaging portions of said socket means as to affect engagement with said engaging portions and thereby hold said socket means against said second open end externally of said body means.

3. A lamp assembly according to claim 1 wherein said body means comprises a generally tubular member, flange means carried by said tubular member and extending generally radially outwardly thereof, wherein said flange means is effective for operatively securing said tubular member to said associated support means thereby enabling the detachable disconnection of said socket means from said tubular member and the simultaneous removal of said bulb means without the necessity of either detaching said tubular member from said associated support structure or detachably disconnecting said lens from said tubular member.

4. A lamp assembly according to claim 1 wherein said body means comprises a generally tubular member, flange means carried by said tubular member and extending generally radially outwardly thereof, wherein said flange means is effective for operatively securing said tubular member to said associated support means thereby enabling the detachable disconnection of said lens means from said tubular member and the removal of said bulb means from said socket means and through said first open end without the necessity of either detaching said tubular member from said associated support structure or detachably disconnecting said socket means from said tubular member.

5. A lamp assembly according to claim 1 wherein said body means comprises a generally tubular member having first and second integrally formed axially extending tubular sections, said first tubular section being relatively smaller and said second tubular section being relatively greater when compared in transverse cross-section, an externally threaded portion formed on said first tubular section, a generally radially outwardly extending wall carried by said tubular member generally between said first and second tubular sections, said wall providing an effective axial abutment for affecting operative abutting engagement with said associated support means, wherein said clearance passage means interconnecting said first and second open ends axially extends through said first and second tubular sections, the effective cross-sectional area of that portion of said clearance passage means passing through said first tubular section being substantially smaller than the effective cross-sectional area of that portion of said clearance passage means passing through said second tubular section, wherein said first open end defines a first generally annular inner tapered surface peripherally thereof, wherein said first latching means comprises a second generally annular tapered surface formed within said clearance passage means axially spaced from said first generally annular inner tapered surface and within said first tubular section, a first annular seating surface formed at said first end generally transverse of said first tubular section, wherein said second open end defines a third generally annular tapered surface peripherally thereof, and further comprising second detent-like latching means effective for detachably securing said socket means to said body means, said second latching means comprising a fourth generally annular tapered surface formed within said clearance passage means generally axially inwardly of said second open end and spaced axially from said third and second annular tapered surfaces, a second annular seating surface formed at said second end generally transverse of said tubular section, wherein said first latching means further comprises resiliently deflectable latching leg portions spaced from each other and formed integrally with said lens means, said leg portions being effective to engage said second annular tapered surface and urge said lens means toward seated engagement with said first annular seating surface, and wherein said second latching means further comprises resiliently deflectably arm portions carried by said socket means, said deflectable arm portions being effective to engage said fourth annular tapered surface and urge said socket means toward seated engagement with said second annular seating surface.

6. A lamp assembly according to claim 1 and further comprising second detent-like latching means effective for detachably securing said socket means to said body means.

7. A lamp assembly according to claim 6 wherein said first open end defines a first generally annular tapered surface peripherally thereof, wherein said first latching means comprises a second generally annular tapered surface formed within said clearance passageway and axially spaced from said first annular tapered surface, wherein said second open end defines a third generally annular tapered surface peripherally thereof, wherein said second latching means comprises a forth generally annular tapered surface formed in said clearance passageway and spaced axially from said third and second annular tapered surfaces, wherein said first latching means further comprises resiliently deflectable latching leg portions formed integrally with said lens means, said leg portions being effective to engage said second annular tapered surface and urge said lens means against said first open end, and wherein said second latching means further comprises resiliently deflectably arm portions carried by said socket means, said deflectable arm portions being effective to engage said fourth annular tapered surface and urge said socket means against said second open end.

8. A lamp assembly according to claim 1 wherein said first latching means comprises substantially nondeflectable ramp-like retaining surface means formed generally in said clearance passage means, and resiliently deflectable means carried by said lens means effective for engaging said retaining surface means to thereby detachably retain said lens means onto said body means.

9. A lamp assembly according to claim 8 wherein said retaining surface means comprises an annular surface formed within said clearance passage means and spaced axially inwardly of said body means with respect to said first open end.

10. A lamp assembly according to claim 1 and further comprising shroud means situated generally about said lens means.

11. A lamp assembly according to claim 10 wherein said shroud means is operatively connected to said lens means.

12. A lamp assembly according to claim 10 wherein said shroud is made of plastic material.

13. A lamp assembly according to claim 10 wherein said shroud means is operatively connected to and carried by said lens means, and wherein said shroud means is of a length substantially exceeding the comparable length of said lens means.

14. A lamp assembly according to claim 13 wherein said shroud is press-fitted onto said lens means, and wherein said shroud comprises an inner opening exposing said lens to view, said inner opening being generally of a conical configuration with the wider portion thereof being disposed axially away from said lens means.

* * * * *